United States Patent
Miyamoto

(10) Patent No.: US 7,089,453 B2
(45) Date of Patent: Aug. 8, 2006

(54) SWITCH DEVICE, STORAGE CONTROL SYSTEM AND TRACE DATA OBTAINING METHOD

(75) Inventor: Kenichi Miyamoto, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 10/862,561

(22) Filed: Jun. 8, 2004

(65) Prior Publication Data
US 2005/0240822 A1 Oct. 27, 2005

(30) Foreign Application Priority Data
Apr. 12, 2004 (JP) ............... 2004-116370

(51) Int. Cl.
*G06F 11/00* (2006.01)
(52) U.S. Cl. .......................... 714/37; 714/45
(58) Field of Classification Search ............... 714/37, 714/45
See application file for complete search history.

(56) References Cited

U.S. PATENT DOCUMENTS

| 6,732,307 B1 | 5/2004 | Edwards | |
|---|---|---|---|
| 6,769,054 B1 * | 7/2004 | Sahin et al. | 711/162 |
| 6,813,731 B1 | 11/2004 | Zahavi et al. | |
| 6,910,160 B1 * | 6/2005 | Bajoria et al. | 714/45 |
| 2002/0170004 A1 | 11/2002 | Parrett et al. | |
| 2004/0093538 A1 * | 5/2004 | Hester et al. | 714/45 |
| 2005/0094568 A1 | 5/2005 | Judd | |

FOREIGN PATENT DOCUMENTS

JP 8-286993 4/1995

* cited by examiner

*Primary Examiner*—Robert Beausoliel
*Assistant Examiner*—Charles Ehne
(74) *Attorney, Agent, or Firm*—Reed Smith LLP; Stanley P. Fisher, Esq.; Juan Carlos A. Marquez, Esq.

(57) ABSTRACT

A fiber channel switch (hereinafter, FC-SW) connected to a plurality of communications devices is provided with a buffer for temporarily storing data received from servers via a first communications port, a trace data storage memory for storing trace data, and a microprocessor (MP) for sending data accumulated in the buffer to a storage control system. The MP stores the information about the data about the received data into the trace data storage memory as trace data, issues a write command to the storage control system if it is detected that trace data sending condition is satisfied, and reads out the trace data stored in the trace data storage memory and sends it to the storage control system.

11 Claims, 12 Drawing Sheets

FIG. 7

| DETECTION TIME | DIFFERENTIAL TIME | PORT | STORAGE CONTROL SYSTEM | SERVER | SUMMARY | BYTES | D_Id | S_Id | OX_Id |
|---|---|---|---|---|---|---|---|---|---|
| 08:27.155_248_435 | 0.075 | FC.Port2 | | 1-R-Rdy | | 4 | | | |
| 08:27.155_248_473 | 0.038 | FC.Port2 | | 29-ARB(F0,F0)- | | 4 | | | |
| 08:27.155_249_130 | 1.881 | FC.Port1 | 2-Idle- | | | 4 | | | |
| 08:27.155_249_205 | 0.075 | FC.Port1 | 1-SOFi3-FC4Status | | SCSI Status | 60 | 0119EF | 0110DC | E918 |
| 08:27.155_249_572 | 1.100 | FC.Port2 | | 23-Idle- | | 4 | | | |
| 08:27.155_249_770 | 0.565 | FC.Port1 | 6-Idle- | | | 4 | | | |
| 08:27.155_250_015 | 0.245 | FC.Port1 | 1-CLS- | | | 4 | | | |
| 08:27.155_250_053 | 0.038 | FC.Port1 | 5670-Idle- | | | 4 | | | |
| 08:27.155_250_420 | 0.848 | FC.Port2 | | 1-CLS- | | 4 | | | |
| 08:27.155_250_458 | 0.038 | FC.Port2 | | 5666-Idle- | | 4 | | | |
| 08:27.155_463_505 | 213.452 | FC.Port1 | 17349-LIP(FB,DC)- | | | 4 | | | |
| 08:27.155_463_797 | 213.339 | FC.Port2 | | 3-Idle- | | 4 | | | |
| 08:27.155_463_910 | 0.113 | FC.Port2 | | 26046-Lip(FB,DQ)- | | 4 | | | |
| 08:27.156_116_641 | 653.137 | FC.Port1 | 248810-Idle- | | | 4 | | | |
| 08:27.156_444_484 | 980.575 | FC.Port2 | | 240027-Idle- | | 4 | | | |
| 08:27.165_481_092 | 9036.608 | FC.Port1 | | 1-SOFi3-ExtLinkReq | RCtl=Extu | 48 | Unidentifie | Unidentifie | EFFF |
| 08:27.165_481_544 | 0.452 | FC.Port2 | | 63201-Idle- | | 4 | | | |
| 08:27.165_483_417 | 9366.776 | FC.Port1 | 1-SOFi3-ExtLinkReq | | RCtl=Extu | 48 | Unidentifie | Unidentifie | EFFF |
| 08:27.165_483_869 | 0.452 | FC.Port1 | 63204-Idle- | | | 4 | | | |
| 08:27.167_860_956 | 2379.412 | FC.Port1 | 54060-ARB(F0,F0)- | | | 4 | | | |
| 08:27.167_863_281 | 2379.412 | FC.Port2 | | 54057-ARB(F0,F0)- | | 4 | | | |
| 08:27.169_896_139 | 2035.183 | FC.Port2 | | 14270-Idle- | | 4 | | | |
| 08:27.169_898_426 | 2035.145 | FC.Port1 | 14271-Idle- | | | 4 | | | |

SWITCH DEVICE, STORAGE CONTROL SYSTEM AND TRACE DATA OBTAINING METHOD

CROSS-REFERENCE TO PRIOR APPLICATION

This application relates to and claims priority from Japanese Patent Application No. 2004-116370, filed on Apr. 12, 2004, the entire disclosure of which is incorporated herein by reference.

BACKGROUND OF THE INVENTION

1. Field of the Invention

The present invention relates to a technique for obtaining trace data.

2. Description of the Related Art

For example, in communications between multiple communications devices performed via a communications network, failures sometimes occur. In order to investigate the flow of processing up to where the failure occurred, a method is known in which trace data is taken. For example, Japanese Patent Application Laid-open No. H8-286993 in the Official Gazette discloses a method in which internal trace information, which is taken during wrap-around in an area of a communications control program having a trace function, is removed to an area provided to each circuit, when a failure is detected after establishing the data link, thus securing information that can be investigated.

Incidentally, failures also occur in a SAN (Storage Area Network) environment where a RAID (Redundant Array of Independent Inexpensive Disks) system and multiple servers are connected via a fiber channel switch, for example. In this SAN environment, sometimes it is difficult to identify the cause of the failure that occurred. For this type of case, one can consider a method in which, for example, analyzers are set up between the server and the fiber channel switch, and between the fiber channel switch and the RAID system, and the environment is made the same as when the failure occurred, and when the same failure occurs again, the cause is ascertained based on the analysis results from the analyzers. However, in this method, it may be troublesome to configure the environment the same as when the failure occurred, and much time may be required until the cause is ascertained.

Such problems are not restricted to SAN environments, but may also be present in other communications environments.

SUMMARY OF THE INVENTION

Therefore, an object of the present invention to facilitate analysis of a failure that has occurred in a communications environment.

Other objects of the present invention should become clear in the following explanations.

A switch device according to a first aspect of the present invention is provided with a plurality of communications ports connected to each of a plurality of communications devices; a buffer area for temporarily storing each piece of data received from the plurality of communications devices via the plurality of communications ports; a trace data storage area for storing trace data; and a processor for sending the data accumulated in the buffer area to a communications device connected to the communications port selected from among the plurality of communications ports. The processor stores information about the data received via each of the plurality of communications ports into the trace data storage area as the trace data. Furthermore, when a storage device is connected to at least one of the plurality of communications ports, if it is detected that a trace data transfer condition is satisfied, the processor issues a write command to the storage device, and reads out the trace data stored in the trace data storage area and sends the trace data to the storage device.

The trace data may be all of the data itself that is passing through the switch device, or may also be 2 or more information elements extracted from multiple data elements constituting each piece of data.

The switch device may be a node switch (e.g., a fiber channel switch) on a communications network connected to a plurality of servers and 1 or more storage control systems (e.g., a RAID system or a magnetic tape library device), or may also be a switch that is provided within the memory control system. In the latter case, the memory control system may have for example multiple channel control units for receiving data from a host device; a cache storage area connected to the channel control units for saving data exchanged with the host device; multiple disk control units for performing control so as to store into the cache storage or read out from the cache storage the data that is exchanged with the host device; multiple disk-type storage devices for storing data sent from the host device by means of control of the multiple disk control units; and a switch device for mutually connecting the multiple channel control units, the multiple disk control units, and the cache storage. Or, the switch device may be the above-mentioned switch device in accordance with the first aspect of the present invention.

Furthermore, the storage device may be a hard disk drive or semiconductor memory, etc., or it may be the storage control system described above. In the case where the storage control system has multiple storage devices, it is possible to decide in advance which storage device the trace data will be stored in among the multiple storage devices. Furthermore, each of the multiple storage devices may be a physical storage device (e.g., a hard disk drive), or may be a logical storage device (e.g., a logical device provided on 1 or more physical storage devices).

In a first embodiment of the switch device according to the first aspect of the present invention, the processor issues a write command to the storage device when in an idle state where processing relating to sending and receiving the data is not performed.

In a second embodiment of the switch device according to the first aspect of the present invention, the processor, in response to a request from the storage device, stops at least the sending processing in the processing for sending and receiving data, and issues the write command.

In a third embodiment of the switch device according to the first aspect of the present invention, when a notification about an occurrence of a failure is received, the processor stores failure occurrence information into the trace data storage area, and protects trace data that has been present since before storing the failure occurrence information so the trace data is not erased. (For example, an address where over-writing is prohibited in the data storage area may be registered in a given storage area, such as a memory provided to the processor.)

In a fourth embodiment of the switch device according to the first aspect of the present invention, each of the plurality of communications ports belongs to at least one of a plurality of zones determined logically. The trace data storage area has a plurality of trace data sub-storage areas corresponding to the plurality of zones, respectively. When it is detected that the trace data transfer condition is satisfied with respect to any of the plurality of zones, the processor issues the write command, and reads out the trace data from the trace data sub-storage area corresponding to the zone satisfying the trace data transfer condition.

A storage control system according to a second aspect of the present invention is connected to a host device via at least one of a plurality of communications ports provided to a switch device, and comprises a plurality of storage devices for storing data, and a storage control system processor for writing data received from the host device into the storage device. The plurality of storage device include a trace data storage device for storing trace data. When the write command and the trace data obtained by the switch device are received, the storage control system processor writes the trace data into the trace data storage device.

For example, when an external device connected to the storage control system requests the trace data inside the trace data storage device, the storage control system processor, in response to the request, may read out the trace data from the trace data storage device and send it to the external device, and send a trace data transfer request to the switch device.

In a trace data obtaining method according to a third aspect of the present invention, a switch device performs a step of temporarily storing into a buffer area data received via each of a plurality of communications ports from a plurality of communications devices included in a storage device. The switch device performs a step of storing information relating to the data received via each of the plurality of communications ports into a trace data storage area provided separately from the buffer area as trace data. Furthermore, the switch device performs a step of sending data accumulated in the buffer area to a communications device connected to a communications port selected from among the plurality of communications ports. The switch device performs a step of issuing a write command to the storage device when it is detected that trace data transfer condition is satisfied. The switch device performs a step of reading out the trace data stored in the trace data storage area. The switch device performs a step of sending to the storage device the trace data that was readout. Furthermore, the storage device performs a step of writing the trace data from the switch device into the storage area inside the storage device in response to the write command.

In a first embodiment of the method according to the third aspect of the present invention, the switch device issues the write command when in an idle state where processing relating to sending and receiving the data is not performed.

In a second embodiment of the method according to the third aspect of the present invention, when a device external to the storage device requests trace data, the storage device sends stored trace data to the external device and sends a trace data transfer request to the switch device, in response to the request. The switch device executes the issuance step in response to the transfer request. The storage device writes the trace data from the switch device into the storage device, and also sends the written trace data to the external device.

In a third embodiment of the method according to the third aspect of the present invention, two host devices included in the plurality of communications devices monitor each other. When one of the host devices detects an occurrence of a failure in the other host device, the one host device sends a notification about the occurrence of a failure to the switch device. The switch device stores the failure occurrence information into the trace data storage area based on the notification. The switch device protects trace data that has been present since before storing the failure occurrence information so that the trace data does not get erased.

BRIEF DESCRIPTION OF THE DRAWINGS

FIG. 7 is an example of a trace data list;

DETAILED DESCRIPTION OF THE PREFERRED EMBODIMENTS

Hereinafter, explanation is given regarding an embodiment of the present invention, with reference made to the drawings.

Figure 1:
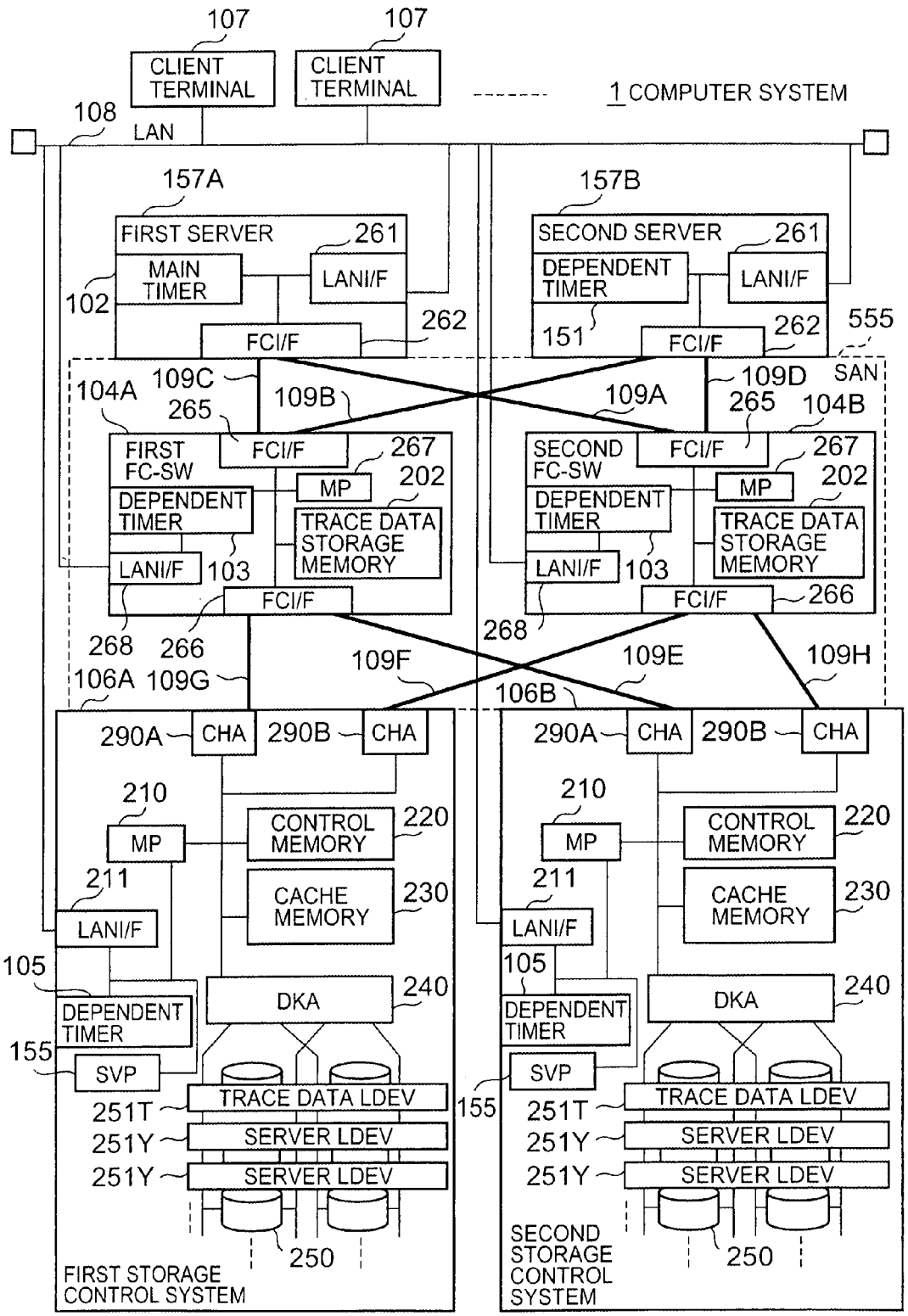
FIG. 1 shows an example of the configuration of a computer system in accordance with an embodiment of the present invention.

FIG. 1 shows an example configuration of a computer system in accordance with an embodiment of the present invention.

The computer system 1 is provided with multiple client terminals 107, multiple servers, 1 or more storage control systems and 1 or more fiber channel switches (hereinafter, abbreviated as "FC-SW") which are connected to a LAN 108 or other first communications network. The multiple servers and the 1 or more storage control systems are connected to a SAN (Storage Area Network) 555 that is constituted by 1 or more FC-SWs.

The client terminal 107 is a personal computer or other such information processing terminal, and can request the server provide given services.

The multiple servers include, for example, a first server 101A and a second server 101B shown in the diagrams. The first server 101A and the second server 101B have essentially the same functions, so explanation is given regarding the first server 101A as representative. The first server 101A performs such things as issuing a write command for writing data to a logical device (hereinafter, abbreviated as "LDEV") which is explained below and is provided to the storage control system, and issuing a read command for reading data from the LDEV. (Hereinafter, write and read commands are sometimes referred to collectively as "I/O requests".) The first server 101A is provided with a main timer 102, a LAN interface circuit (hereinafter, abbreviated as "LAN I/F") 261, and a fiber channel interface circuit (hereinafter, abbreviated as "FC I/F") 262. Furthermore, the first server 101A is also provided with a CPU, memory and other hardware for information processing, but these are not shown in the diagram.

In the first server 101A, the date and time are managed by the main timer 102. The date and time recognized by the main timer 102 are outputted via the LAN I/F 261 as a main date and time used in the network time protocol. On the other hand, a date and time recognized by dependent timers, which are described below and is provided to the second server 101B, the FC-SW, the storage control system, etc., are adjusted to the main date/time, in accordance with the network time protocol. That is, the date/time at all the nodes of the computer system 1 are synchronized. Note that, the main timer 102 may be at any node on the LAN 108.

Connected to the FC I/F 262 are 1 or more fiber cables, such as a fiber cable 109A connected to the second FC-SW 104B, and a fiber cable 109C connected to the first FC-SW 104A. A fiber cable 109D connected to the second FC-SW 104B, and a fiber cable 109B connected to the first FC-SW 104A, may be connected to the FC I/F 262 of the second server 101B as examples of the 1 or multiple fiber cables.

The 1 or more storage control systems include, for example, a first storage control system 106A and a second storage control system 106B which are shown in the diagrams. The first storage control system 106A and the second storage control system 106B have essentially the same functions, so explanation is given regarding the first storage control system 106A as representative of both storage control systems. The first storage control system 106A is a disk array system such as a RAID (Redundant Array of Independent Inexpensive Disks) system, where multiple physical disks (e.g., hard disk drives) 250 are arranged in an array. The first storage control system 106A is provided with a LAN I/F 211, a dependent timer 105, 1 or more channel adapters (hereinafter, "CHA"), a control memory 220, a cache memory 230, multiple physical disks 250, 1 or more disk adapters (hereinafter, "DKA"), a service processor (hereinafter, "SVP") 110 and a microprocessor (hereinafter, "MP") 210.

The date/time of the dependent timer 105 is adjusted in a dependent fashion to the above-mentioned main date/time that is taken in via the LAN I/F 211.

As the 1 or more channel adapters (hereinafter, "CHA"), two CHAs 290A, 290B are provided as an example. The CHAs 290A, 290B are interface circuits. For example, they may be fiber channel interface circuits to which are connected 1 or multiple fiber cables, for example. As the 1 or multiple fiber cables, a fiber cable 109G connected to the first FC-SW 104A may be connected to the CHA 290A, and a fiber cable 109F connected to the second FC-SW 104B may be connected to the CHA 290B. Thus, the first storage control system 106A is connected through the first FC-SW 104A and the second FC-SW 104B to the first server 101A and the second server 101B. The CHA 290A and the CHA 290B have essentially the same functions, so explanation is given regarding the CHA 290A as a representative. The CHA 290A writes data of an I/O request into the cache memory 230, according to controls by the MP 210, based on an I/O request (input/output request) received via the fiber cable 109G, and obtains the data written into the cache memory 230 by means of the DKA 240 and outputs this data to the fiber cable 109G.

The control memory 220 is a memory for storing such things as control information pertaining to control of the I/O request processing (e.g., the correspondence between an address on the cache memory 130 and an address on the LDEV). The MP 210 performs various processing based on, for example, the control information and the like in the control memory 220.

The cache memory 230 is a memory for temporarily storing the data that is exchanged between the CHAs 290A, 290B and the DKA 240. Note that, the control memory 220 and the cache memory 230 do not need to be physically separated. For example, memory space can be divided in a single memory unit.

The multiple physical disks 250 are provided with 2 or more LDEVs (or, in other words, logical units or logical volumes). The 2 or more LDEVs include, for example, a server LDEV 251Y for storing data outputted from the first server 101A or the second server 101B, and also a trace data LDEV 251T for storing trace data, which is described below.

The DKAs 240 shown in the diagram, for example, may be provided as the 1 or more DKAs. Under the control of the MP 210, the DKA 240 obtains the data written into the cache memory 130 by means of the CHA 290A or the CHA 290B, and writes this data into a place inside the LDEV corresponding to the address on the cache memory 130 where that data is. Furthermore, according to the controls by the MP 210, the DKA 240 reads out data from the LDEV, and writes the data that was read out into the cache memory 130.

The SVP 110 is an information processing terminal, such as a notebook-type personal computer, for example. The SVP 110 can issue a command to the MP 210 to obtain the data inside any of the LDEVs and do such things as display the obtained data on a display screen of the SVP 110, or the like.

The MP 210 controls the overall operations of the first storage control system 106A based on the control information in the control memory 220.

A first FC-SW 104A and a second FC-SW 104B, for example, are provided as the 1 or more FC-SWs. The first FC-SW 104A and the second FC-SW 104B have essentially the same functions, so explanation is given regarding the first FC-SW 104A as a representative. Connected to the first FC-SW 104A are the first server 101A and the second server 101B, and the first storage control system 106A and the second storage control system 106B. The first FC-SW 104A switches the partner device connected to the first server 101A or the second server 101B, selectively between the first storage control system 106A and the second storage control system 106B. The device connected to the first server 101A or the second server 101B is switched selectively between the first storage control system 106A and the second storage control system 106B by the first FC-SW 104A. The first FC-SW 104A is provided with a LAN I/F 268, a dependent timer 103, FC I/Fs 265, 266, a trace data storage memory 202 and an MP 267.

The time/date of the dependent timer 103 is adjusted in a dependent fashion to the above-mentioned main date/time, which is taken in via the LAN I/F 268.

1 or more fiber cables are connected to the FC I/Fs 265, 266. As an example, the above-mentioned fiber cables 109C, 109B are connected to the FC I/F 265, and the above-mentioned fiber cable 109G and the fiber cable 109E that is connected to the CHA 290A of the second storage control system 106B are connected to the FC I/F 266. Thus, the first server 101A and the second server 101B, and the first storage control system 106A and the second storage control system 106B are connected to the first FC-SW 104A.

The trace data storage memory 202 is a memory for storing trace data relevant to the data passing through the first FC-SW 104A.

The MP 267 controls the overall operations of the first FC-SW 104A. For example, each time data passes through the first FC-SW 104A, the MP 267 generates trace data based on the data, and stores the generated trace data into the trace data storage memory 202. Furthermore, when trace data sending condition which is described in detail below is satisfied (e.g., when the MP 267 is in an idle state), the MP 267 reads out the trace data being stored in the trace data storage memory 202 and sends a write command to write the trace data into the trace data LDEV 251T to at least one of the first storage control system 106A and the second storage control system 106B.

In this way, in the present embodiment, each time data inputs and outputs are performed among the FC-SWs 104A, 104B, the servers 101A, 101B and the storage control systems 106A, 106B, the trace data based on the data is generated and stored. Then, when the trace data sending condition is satisfied, the FC-SWs 104A, 104B send the accumulated 1 or more pieces of trace data to at least one of the first storage control system 106A or the second storage control system 106B. Thus, the 1 or more pieces of trace data accumulated in the FC-SW are stored in the LDEV 251T provided for the trace data. Note that, the destination to which the trace data is sent may be selected dynamically, or may be determined in advance. For example, it can be determined in advance to store the trace data accumulated in the first FC-SW 104A into the trace data LDEV 251T of the first storage control system 106A, and to store the trace data accumulated in the second FC-SW 104B into the trace data LDEV 251T in the second storage control system 106B. (This pre-determined information may be stored in each of the FC-SWs.) Furthermore, even when such pre-determinations have been made, when, for example, the first FC-SW 104A detects that communications are impossible between the first FC-SW 104A and the first storage control system 106A, the first FC-SW 104A may switch the destination for sending the accumulated trace data from the trace data LDEV 251T of the first storage control system 106A to the trace data LDEV 251T of the second storage control system 106B.

In the present embodiment, the data exchanged over the SAN 555 between the servers and the storage control systems may be structured as exemplified below.

Figure 2:
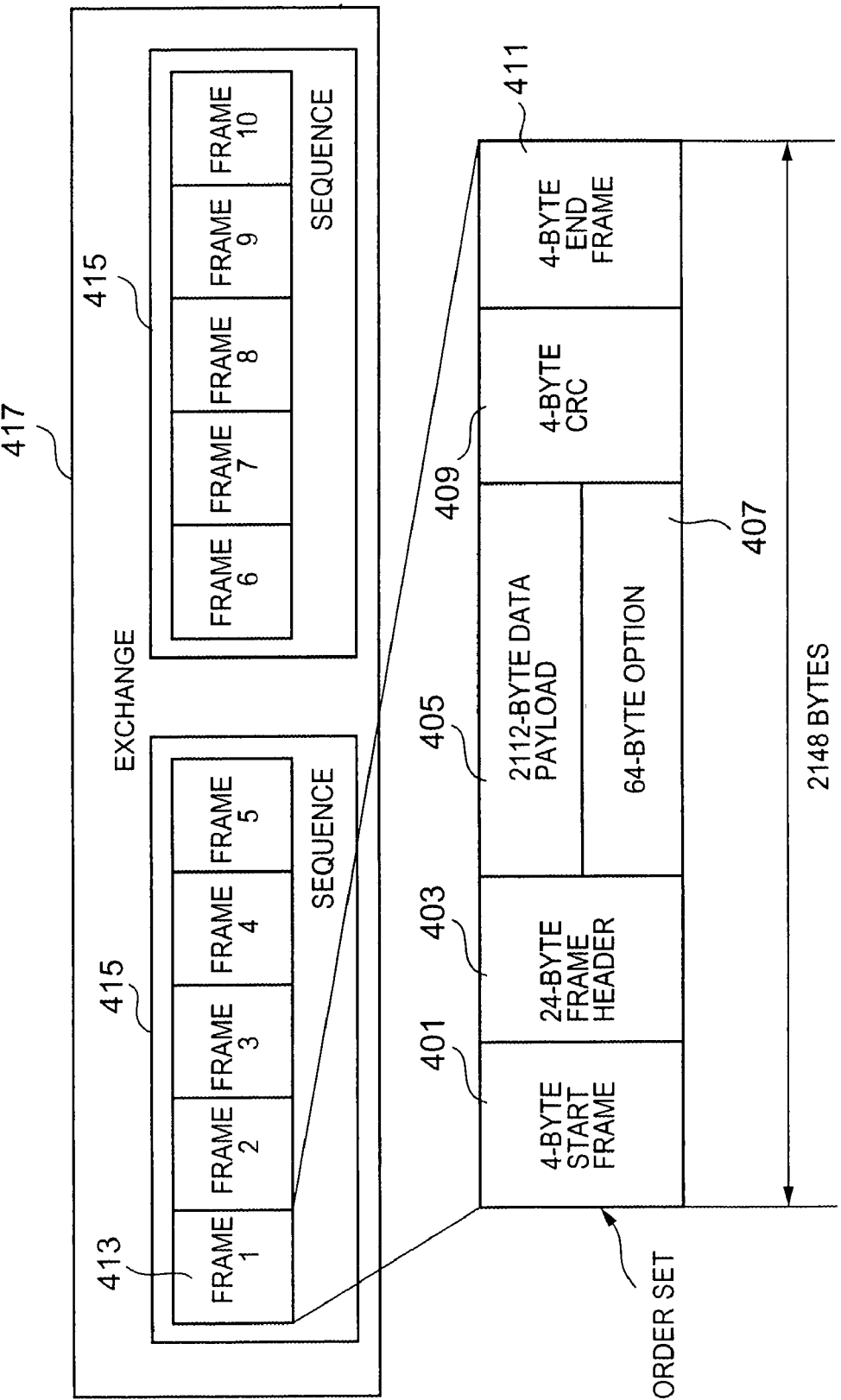
FIG. 2 shows an example of the structure of data flowing in a SAN 555.

FIG. 2 shows an example structure of the data flowing through a SAN 555.

The word "data" that is used in the present embodiment typically refers to a data frame 413 shown in FIG. 2. The length of the data frame 413 is variable and may be up to 2,148 bytes, for example. The data frame 413 contains, for example, an SOF (Start Of Frame) ordered set 401, a frame header 403, a data payload 405, an option 407, a CRC (Cyclic Redundancy Check) code 409, and an EOF (End Of Frame) ordered set 411. The SOF ordered set 401 indicates the start of the data frame 413. The frame header 403 expresses transfer attributes of the data frame 413 (e.g., from which server to which LDEV to write to). For example, the data frame 413 has a source ID expressing the source sending the data frame, and a destination ID expressing the destination to which the data frame is sent. The data payload 405 is actual data (e.g., a code group to be written into the LDEV). The option 407 is different information from the actual data. The CRC (Cyclic Redundancy Check) frame 409 is a code used to perform an error check. The EOF ordered set 411 indicates the end of the data frame 413. In this type of data frame 413, for example, information about the status of the sending source device when the data frame 413 was sent may be incorporated in the constitute elements other than the data payload 405 and the option 407. In other words, for example, when sending the data frame 413, both the server and the storage control system may incorporate their own status at the time of sending into the given constitutive elements of the data frame 413.

In the sequence 415, multiple data frames 413 are combined into one small group and serve as a unit for transferring data in bulk. In order to express a size of 16 bits, for example, the maximum data size of the sequence 415 can be 128 MB. Multiple sequences 415 are combined into one large group to for an exchange 417. Each FC-SW performs communications using the exchange 417 as a unit, for example.

Hereinafter, explanation is given regarding a construction of the FC-SW, taking the first FC-SW 104A as a representative example.

Figure 3:
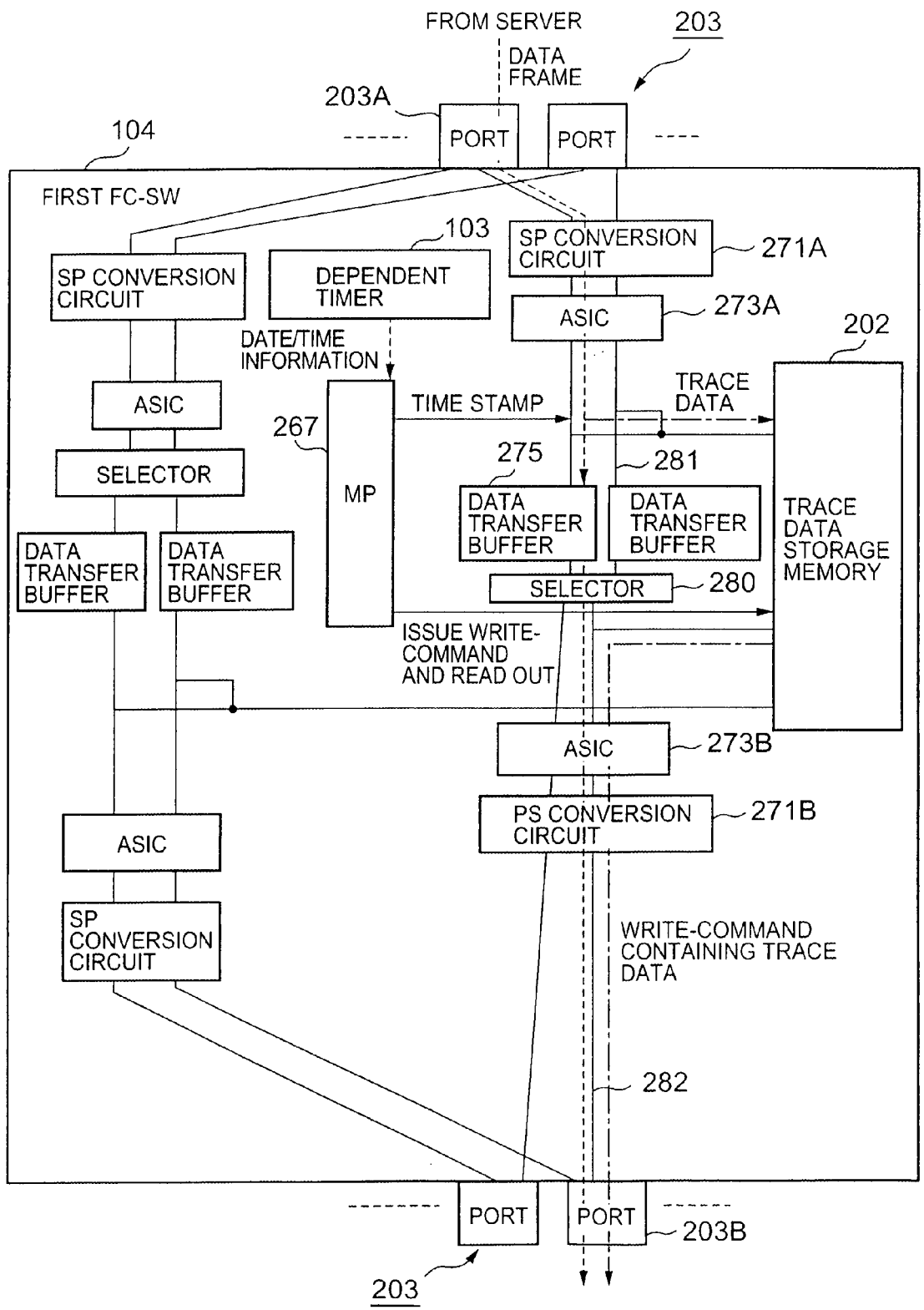
FIG. 3 shows an example of the configuration of a first FC-SW 104A.

FIG. 3 shows an example construction of the first FC-SW 104A.

The first FC-SW 104A is provided with multiple communications ports 203. These communications ports 203 include 1 or more first communications ports 203A, and 1 or more second communications ports 203B. Below, in order to simplify the explanations, the direction when data is transferred from the first communications port 203A to the second communications port 203B is referred to as the "downward direction", and this data transfer route is referred to as the "downward direction route". On the other hand, the direction when data is transferred from the second communications port 203B to the first communications port 203A is referred to as the "upward direction", and this data transfer route is referred to as the "upward direction route".

In the first FC-SW 104A, along the downward direction route from the 1 or more first communications ports 203A to the 1 or more second communications ports 203B, there are provided an SP conversion circuit 271A, an ASIC 273A, 1 or more data transfer buffers 275, a selector 280, an ASIC 273B, and a PS conversion circuit 271B. (Note that this construction is similar along the upward direction route as well, so explanation of the upward direction route is omitted.)

The SP conversion circuit 271A is a circuit for converting from serial to parallel, and then outputting, the data format inputted via the first communications port 203A. On the other hand, the PS conversion circuit 271B is a circuit for converting from parallel to serial, and then outputting, the inputted data format.

The ASICs (Application-Specific Integrated Circuits) 273A, 273B are circuits for controlling fiber protocol.

The data transfer buffer 275 is provided to each first communications port 203A. The data transfer buffer 275 temporarily accumulates the data frames 413 received via the corresponding first communications port 203A.

The selector 280 is located between 1 or more first bus lines 281 connected to each of the 1 or more first communications ports 203A, and 1 or more second bus lines 282 connected to each of the 1 or more second communications ports 203B. According to a command from the MP 267, the selector 280 connects a first bus line 281 selected from among the 1 or more first bus lines 281, to a second bus line 282 selected from among the 1 or more second bus lines 282.

Connected to each of the 1 or more first bus lines 281 is a memory bus line 283, which is on the upstream side of the data transfer buffer 275, and leads to the trace data storage memory 202.

When the data frame 413 is received via the communications ports 203, the MP 267 stores the data frame 413 into the data transfer buffer 275 that corresponds to the communications ports 203. Then, the MP 267 reads out the data frame 413 from the data transfer buffer 275, controls the selector 280, and outputs the data frame 413 that was read out, from the communications ports 203 that the destination device is connected to.

Figure 4:
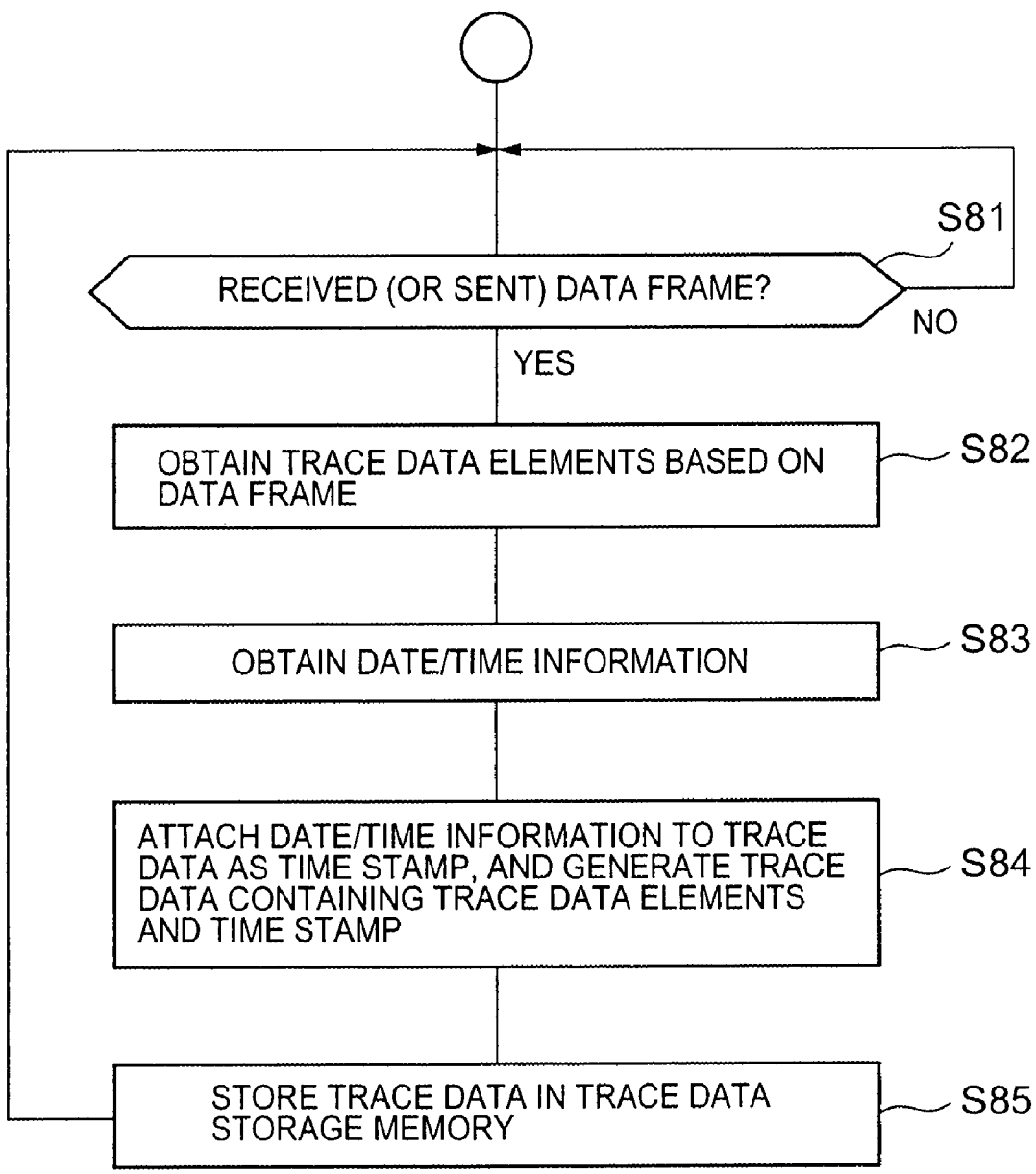
FIG. 4 shows a processing flow of the first FC-SW 104A performed when trace data is to be stored in a trace data storage memory 202.

Furthermore, as shown in FIG. 3 and FIG. 4, when the data frame 413 is received via the communications ports 203 (or when the data frame 413 inside the data transfer buffer 275 is sent via the communications ports 203) (Y at step S81 in FIG. 4), the MP 267 obtains trace data elements based on that data frame 413 (S82). Here at S82, the MP 267 obtains, for example, either the data frame itself, or 2 or more trace data elements selected from the multiple trace data elements constituting the data frame 413, (for example, selected from the elements of the data frame 413, excluding at least one of either the pay load 405 or the option 407, which are large in their data size) as trace data elements. The MP 267 obtains the date/time information from the dependent timer 103 (S83), and using the obtained date/time information as a time stamp, the trace data elements obtained at S82 are stamped so as to generate trace data that contains the trace data elements and the time stamp (S84). The MP 267 stores the trace data thus generated into the trace data storage memory 202 (S85). Note that the date and time expressed by the time stamp that is attached here are the reception date and time of the data frame 413 (or the sending date and time). Specifically, the reception date/time refers to the date/time when the data frame 413 is stored into the data transfer buffer 275, and the sending date/time refers to the date/time when the data frame 413 is read out from the data transfer buffer 275.

Each time the data frame 413 is received via the communications ports 203 (or each time the data frame 413 inside the data transfer buffer 275 is sent via the communications ports 203), the MP 267 executes S81 to S85, which are described above. Accordingly, the trace data accumulates in the trace data storage memory 202 one after the other. The trace data accumulated in the trace data storage memory 202 is transferred to the trace data LDEV 251T by, for example, the following processing.

Figure 5:
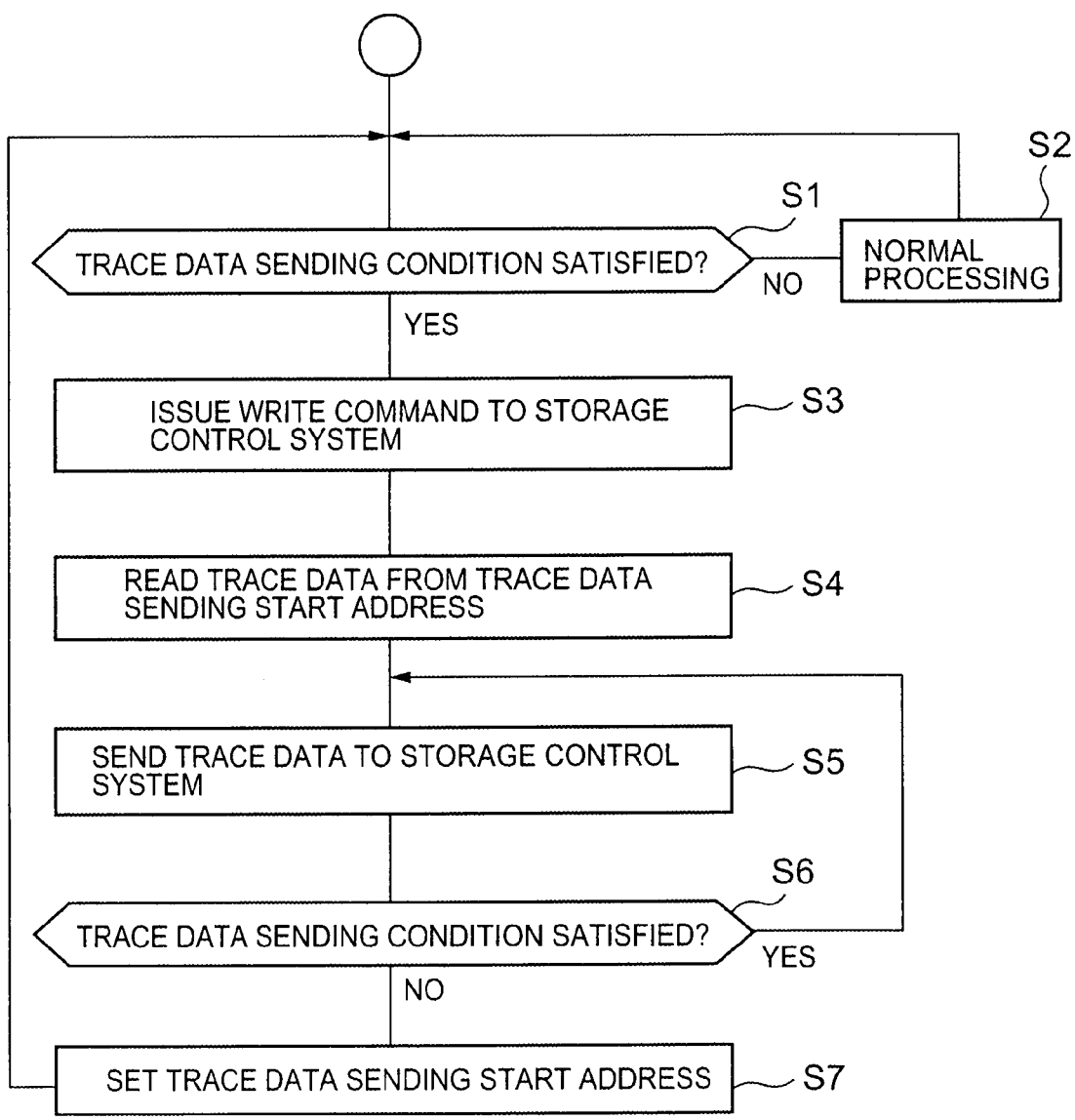
FIG. 5 shows a processing flow of the first FC-SW 104A for transferring the trace data stored in the trace data storage memory 202.

Namely, as shown in FIG. 3 and FIG. 5, the MP 267 determines whether or not the trace data sending condition is satisfied (S1). Here, the trace data sending condition may be, for example, that at least one piece of trace data is present in the trace data storage memory 202 and the state is idle where processing to send and receive the data frames 413 is not performed. (In other words, no data frame 413 is present on the SAN 555.)

When it is determined that the trace data sending condition is not satisfied (N at S1), the MP 267 performs the normal processing. For example, it stores the received data frame 413 into the data transfer buffer 275, generates the trace data for that data frame 413 and writes the trace data into the trace data storage memory 202, and sends the data frame 413 stored in the data transfer buffer 275 to the device that is the sending destination.

When it is determined that the trace data sending condition is not satisfied (Y at S1), the MP 267 issues the write command to at least one of the first storage control system 106A and the second storage control system 106B (S3). Note that, information about the storage control system that the write command will be issued to (e.g., such as a logical path name for the trace data LDEV in that storage control system) may be registered in a given memory area within the first FC-SW 104A (e.g., such an area provided on the trace data storage memory), and the MP 267 may send the write command in accordance with this information. Furthermore, the MP 267 may also detect the state of traffic between the first FC-SW 104A and each storage control system, and send the write command to the storage control system connected to the fiber cable where the write command will flow most easily based on the state of traffic.

After S3, the MP 267 reads out the trace data, beginning at a trace data sending start address (S4). Here, the trace data sending start address is an address indicating where in the trace data storage memory 202 to start reading the trace data out from. The trace data sending start address may be set in a given memory area, such as a register or the like inside the MP 267.

The MP 267 sends the trace data that was read out to the storage control system that the write command was issued to at S3 (S5). While in the state where the trace data sending condition is satisfied (N at S6), the MP 267 may repeat the processing of S5 until it finishes sending all the trace data in the trace data storage memory 202 for example. If it is detected that the trace data sending condition is no longer satisfied (Y at S6), the MP 267 saves the trace data sending start address to be used next time, and returns to S1.

Figure 6:
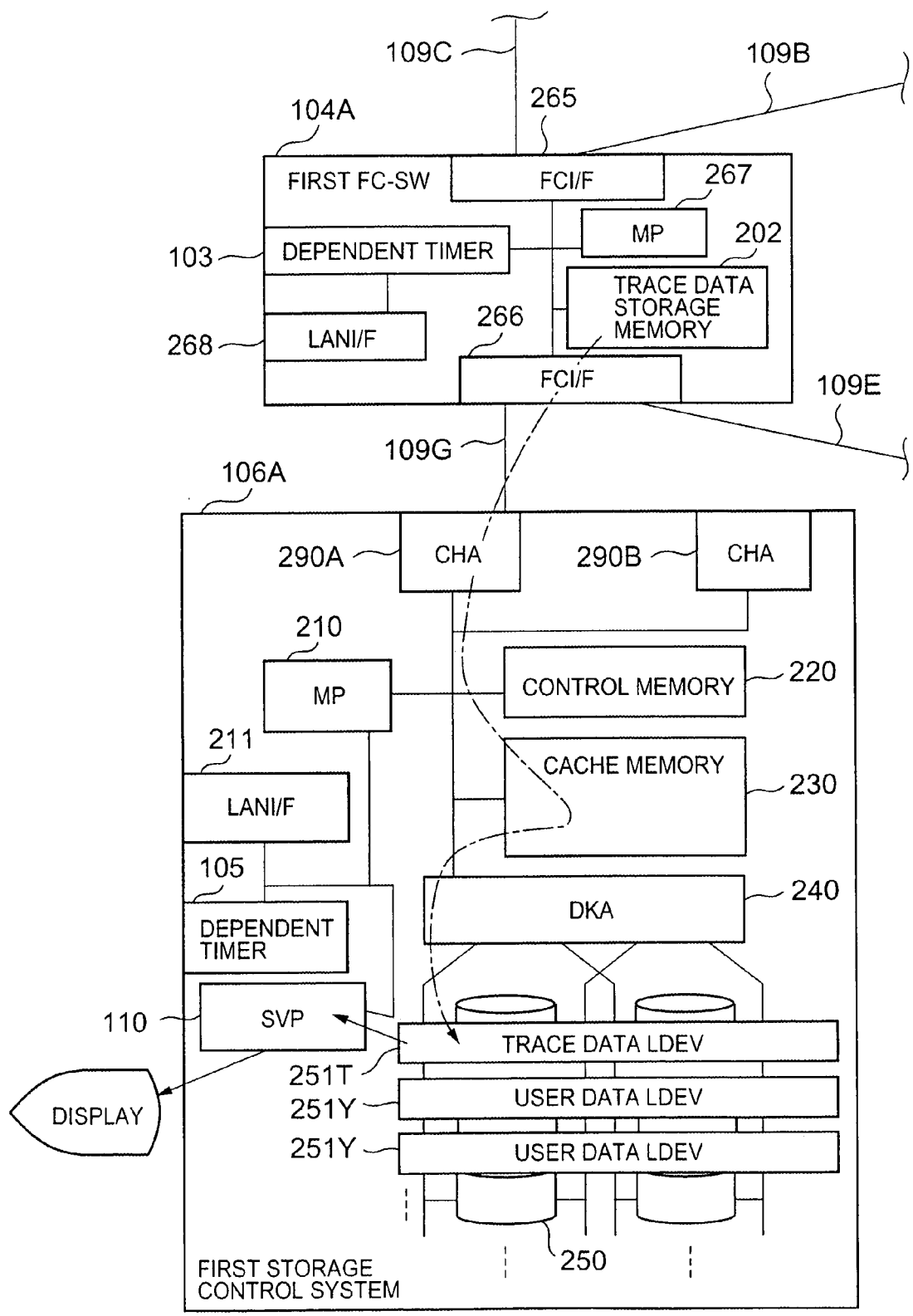
FIG. 6 shows a route traveled by trace data that is read out from the trace data storage memory 202 and transferred to a first storage control system 106A.

Thus, in the flow of processing described above, for example when the trace data is sent from the first FC-SW 104A to the first storage control system 106A, the MP 210 in the first storage control system 106A processes the write command, and, as shown by the single-dot line in FIG. 6, the trace data is written into the trace data LDEV 251T via the CHA 290A, the cache memory 230 and the DKA 240.

The MP 210 can provide the trace data inside the trace data LDEV 251T to the SVP 110 in response to a request from the SVP 110. The SVP 110 generates and displays a trace data list based on the trace data that was obtained.

FIG. 7 is an example of a trace data list.

The information entries in the trace data list 596 are, for example, a detection time 511, a differential time 513, a communications port number 514, storage control system information 515, server information 517, a destination ID 521, and a source ID 523. In the trace data list 596, information corresponding to each of the above-mentioned types of information are displayed for each piece of trace data.

The detection time 511 is the date/time indicated by the time stamp contained in the trace data.

The differential time 513 is the differential between the immediately previous detection time and the current detection time.

The communications port number 514 is a number assigned to the communications port that the data frame 413 passed through when it was received (or sent).

The storage control system information 515 is information that includes, for example, information for identifying the storage control system, and information about the status of the storage control system when sending the data frame 413.

The server information 517 is information that includes, for example, information for specifying the server, and information about the status of the server when the data frame 413 was sent.

The designation ID 521 is an ID of the destination to which the data frame 413 is sent.

The source ID 523 is an ID of the source from which the data frame 413 is sent.

The list 596 shown in the diagram may be generated in a case where, for example, the trace data is read out from the trace data LDEV 251T, in order to investigate the cause of failure where the storage control system suddenly cannot be recognized from the server. It is assumed here that the trace data that is read out is outputted from the first FC-SW 104A. In the generated list 596, the LIP signal (connection initialization signal) information is recorded into the row for the storage control system information 515, as shown in frame 501. In this case, it is understood that the above-mentioned failure was caused because the LIP signal to the first FC-SW 104A was issued according to conditions on the storage control system side.

Thus, according to the embodiment described above, at the first FC-SW 104A (or the second FC-SW 104B) where the data exchanged between each of the multiple servers and each of the multiple storage control systems (i.e., the data flowing on the SAN 555) is collated, the trace data for all the data that passes through the first FC-SW 104A is generated and stored. Examining the information based on the trace data that is thus accumulated, one would expect that when a failure occurs the clarification of the cause can be performed quickly. As a method for culling the trace data, one can also consider a method in which analyzers are inserted between the servers 101A, 101B and the FC-SWs 104A, 104B, and between the FC-SWs 104A, 104B and the storage control systems 106A, 106B, and the data culled by each analyzer are obtained respectively. However, in the present embodiment, as described above, the FC-SWs 104A, 104B where the data flowing through the SAN 555 is temporarily collated perform the accumulation of the trace data. Therefore, the data can be obtained more efficiently than by using such a method.

Furthermore, according to the embodiment described above, the first FC-SW 104A (and the second FC-SW 104B) send the accumulated trace data to the storage control system systems 106A and/or 106B during the idle state where sending and receiving of data frames is not being performed. Accordingly, in addition to the exchanges between the servers 101A, 101B and the storage control system 106A, 106B even when the processing is executed to send the trace data to the storage control systems, it is still possible to suppress reduction in the throughput of the exchanges between the servers 101A, 101B and the storage control system 106A, 106B. Incidentally, in the abovementioned technique disclosed in Japanese Patent Application Laid-open No. H8-286993, the host computer obtains internal trace information from a communications control processing device at freely determined timing, which is different from the present invention.

A number of modified examples can be considered for the embodiment described above. Hereinafter, explanations are given regarding such variations.

(1) First Modified Example

Figure 8A:
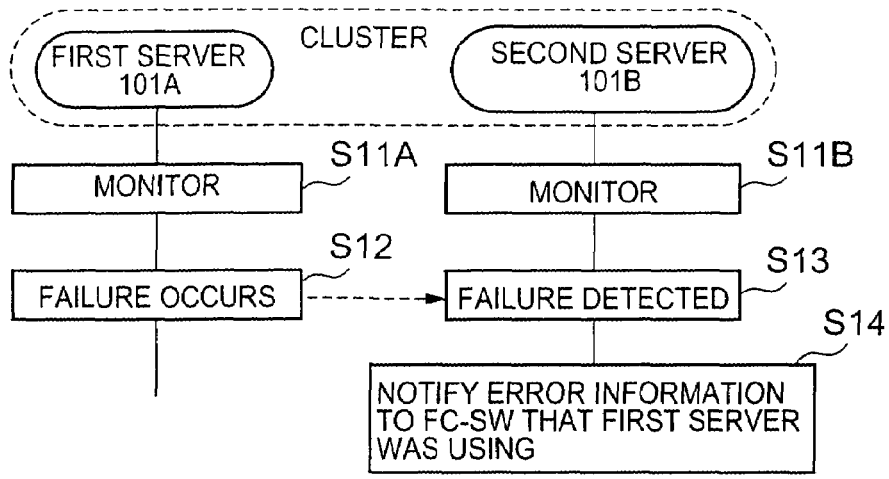
FIGS. 8A to 8C show processing flows performed in a first modified example of an embodiment of the present invention.
Figure 8B:
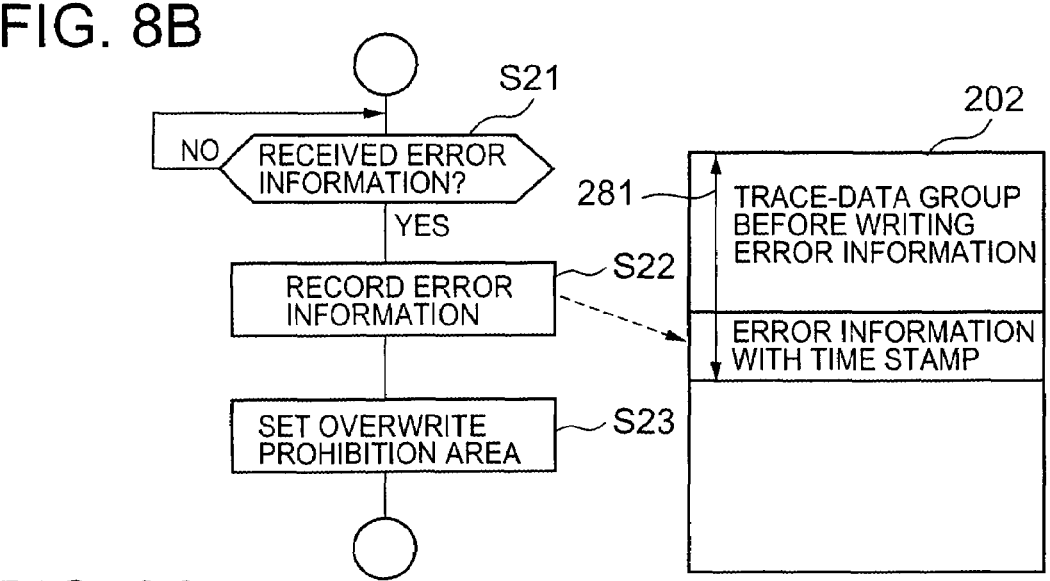
Figure 8C:
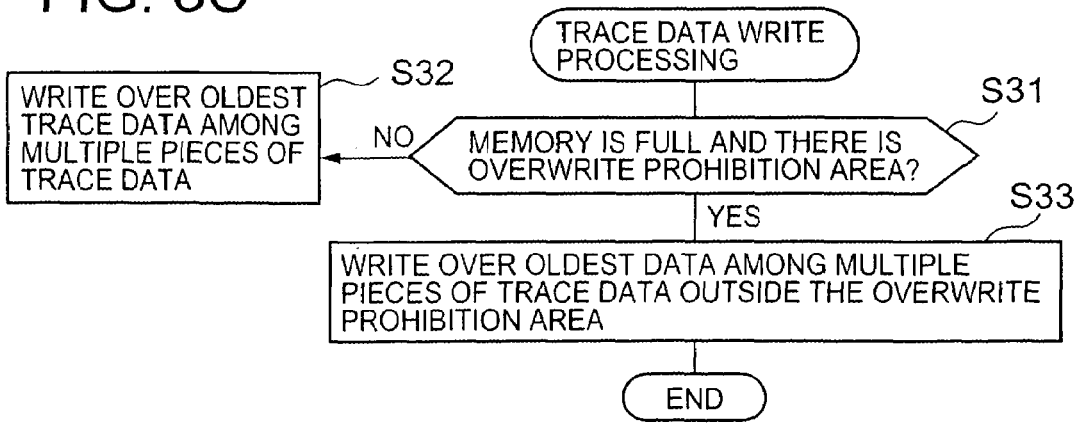

FIGS. 8A to 8C show processing flows performed in a first modified example of the embodiment of the present invention.

As shown in FIG. 8A, according to the first modified example, the first server 101A and the second server 101B constitute a cluster and monitor each other (S11A, S11B). When this is performed, for example when a failure occurs at the first server 101A (S12), the second server 101B detects the failure that occurred at the first server 101A as a result of monitoring the first server 101A (S13). Then, the second server 101B sends error information (i.e., dump information) about the failure through the LAN 108 to the first FC-SW 104A that the first server 101A was using (in other words, the first FC-SW 104A that was sending/receiving the data frame 413 to/from the first server 101A) (S14).

As shown in FIG. 8B, when the error information is received from the second server 101B (Y at S21), the MP 267 of the first FC-SW 104A time fixes the time stamp to the received error information and writes this into the trace data storage memory 202 (S22). A overwrite prohibition area is set on a specific storage area in the first FC-SW 104A (S23). The overwrite prohibition area refers to the memory area where there is data that ought not be written over (i.e., erased). The microprogram in the MP 267 is made so as not to write data into the overwrite prohibition area.

As shown in FIG. 8C, in a case where there is no empty space in the trace data storage memory 202 when writing the new trace data into the trace data storage memory 202, if no overwrite prohibition area has been set (N at S31), the MP 267 of the first FC-SW 104A writes the new trace data over the oldest trace data among the multiple pieces of trace data. On the other hand, in the case mentioned above, if the overwrite prohibition area has been set (Y at S31), then the MP 267 of the first FC-SW 104A writes the new trace data over the oldest trace data among the multiple pieces of trace data that exist outside the overwrite prohibition area (S33).

According to the first modified example, even when the failure that occurred at the first server 101A suddenly makes the communications that were being performed with the first FC-SW 104A stop, the second server 101B detects the failure at the first server 101A, and sends the error information to the first FC-SW 104A which the first server 101A was communicating with. Then, when the first FC-SW 104A receives the error information, the first FC-SW 104A writes this error information into the trace data storage memory, and the trace data that was accumulated before the error information was written is protected so that it is not erased. Thus, since all the trace data from before the writing of the error information can be obtained, one can expect that this increases the possibility of identifying the cause of the failure. Note that, the first FC-SW 104A can protect the trace data from before the error information was received as described above even in a case where the error information is received from the storage control system 106A, 106B.

(2) Second Modified Example

Figure 9A:
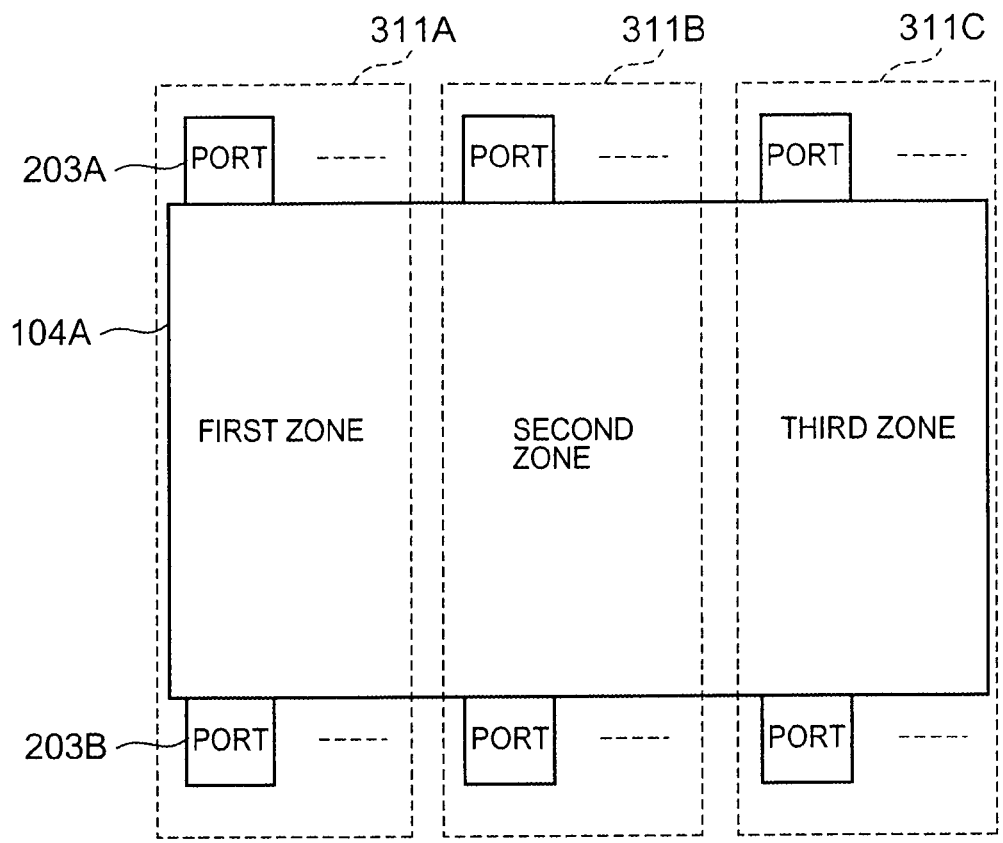
FIGS. 9A to 9B show concepts of the first FC-SW 104A in accordance with a second modified example of an embodiment of the present invention.
Figure 9B:
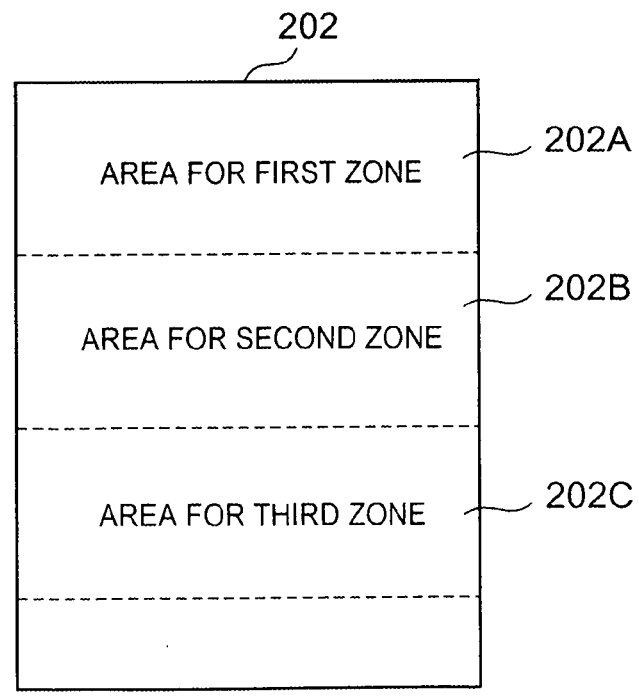

FIGS. 9A to 9B show concepts of the first FC-SW 104A in accordance with a second modified example of the embodiment of the present invention.

As shown in FIG. 9A, the first FC-SW 104A is divided into multiple logical zones. For example, the first FC-SW 104A is divided into 3 logical zones, a first zone 311A, a second zone 311B and a third zone 311C. Furthermore, zone information about which zone which first communications port 203A and which second communications port 203B that are mounted on the first FC-SW 104A belong to, is recorded in a given memory area inside the first FC-SW 104A. Specifically, the zone information is information which has zone numbers corresponding to each port number of the 1 or more first communications ports 203A and the 1 or more second communications ports 203B, for example. The MP 267 of the FC-SW 104 can execute various processing on each zone based on the zone information.

Furthermore, as shown in FIG. 9B, the trace data storage memory 202 is divided into multiple sub-areas 202A to 202C that each correspond to the multiple logical zones 311A to 311C.

In the second modified example, the MP 267 of the first FC-SW 104A can perform processing as follows.

Figure 10:
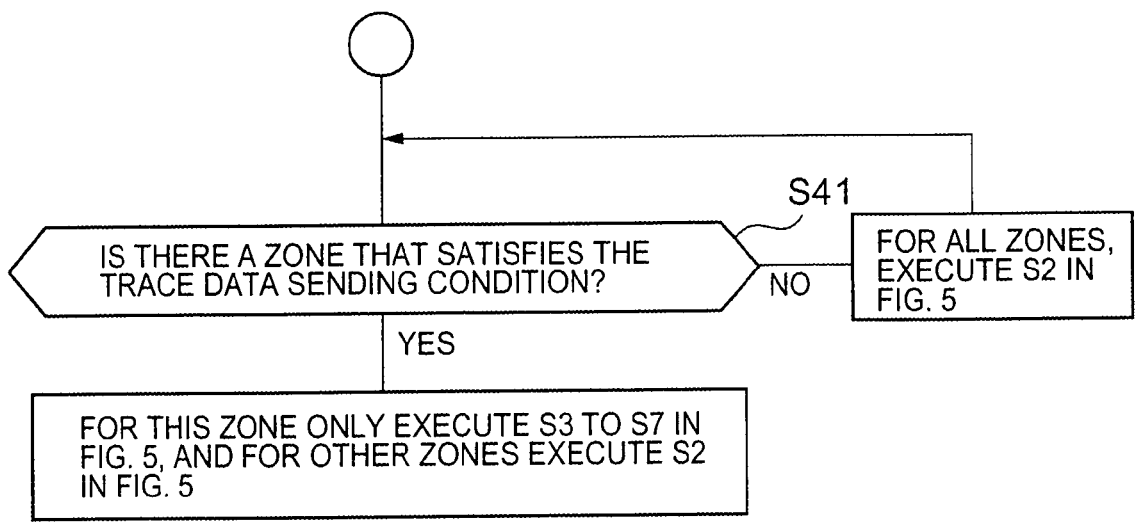
FIG. 10 shows an example of a processing flow performed in the second modified example of an embodiment of the present invention.

FIG. 10 shows an example of a processing flow performed in the second modified example.

The MP 267 determines whether or not any of the zones 311A to 311C satisfy the trace data sending condition (S31). When the result is that there is not even 1 zone that satisfies the trace data sending condition (N at S31), the MP 267 executes S2 in FIG. 5 for all the zones. On the other hand, when the result from S31 is that there is even 1 zone which satisfies the trace data sending condition (Y at S31), the MP 267 executes S3 to S7 in FIG. 5 for only the zone that satisfies the condition, and executes S2 in FIG. 5 on the other zones.

According to the second modified example, the first FC-SW 104A is divided into the logical zones, and controls are performed on the divided zones separately. Therefore, it is possible to transfer the accumulated trace data to the storage control system and execute the processing to send/receive the data frames at the same efficiently.

(3) Third Modified Example

Figure 11:
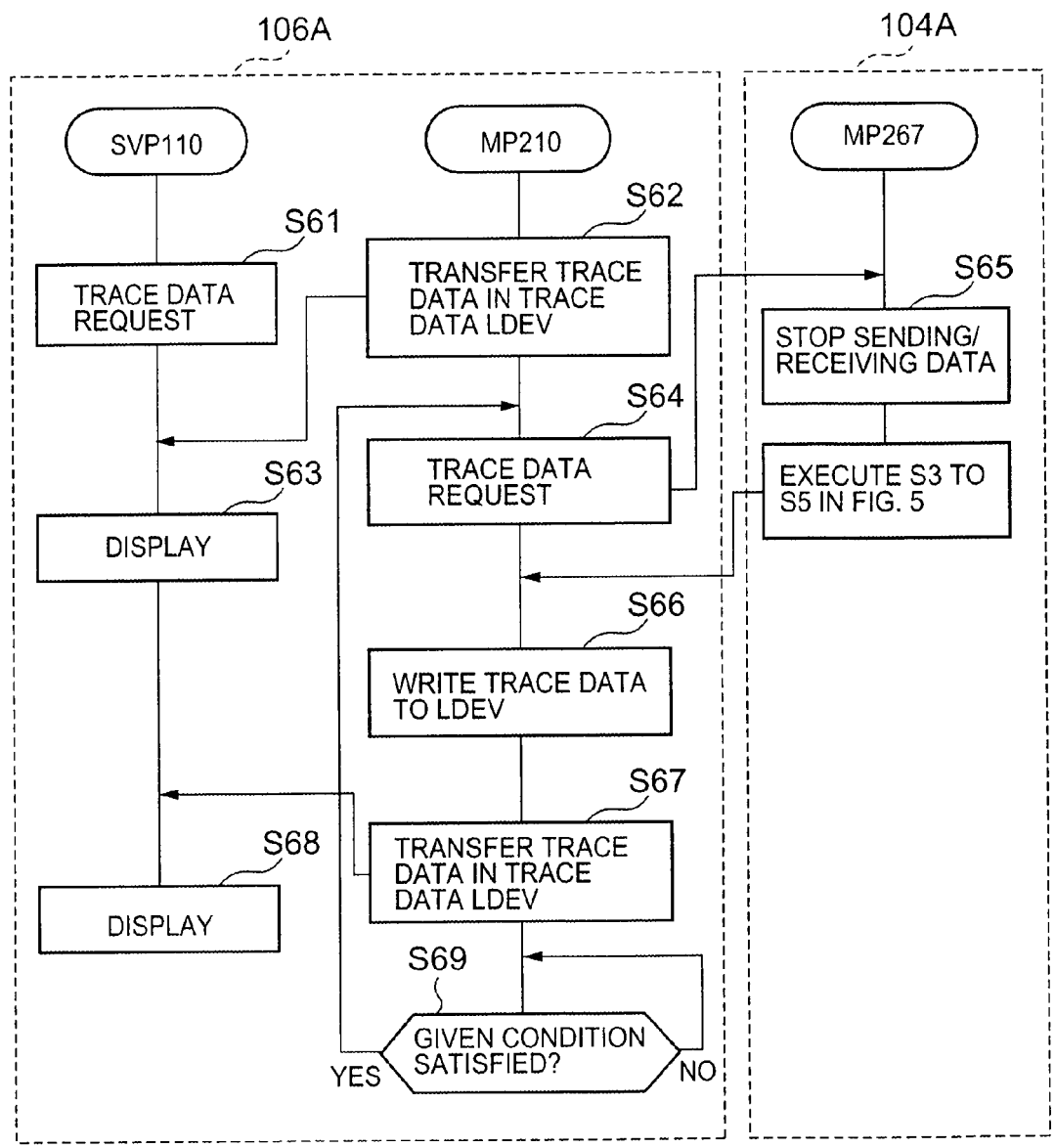
FIG. 11 shows a processing flow performed in a third modified example of an embodiment of the present invention.

FIG. 11 shows a processing flow performed in a third modified example of the present embodiment.

When the SVP 110 issues the trace data request to the MP 210 of the first storage control system 106A (S61), the MP 210 transfers the trace data inside the trace data LDEV 251T to the SVP 110 (S62). The SVP 110 generates and displays the trace data list mentioned above, for example, based on the trace data received in the processing at S62 (S63).

After S62, the MP 210 sends the trace data request to the first FC-SW 104A (and the second FC-SW 104B) (S64). In response to the request, the MP 267 of the first FC-SW 104A (and the second FC-SW 104B) stops sending and receiving data (or in other words, stops the receiving and sending of the data frames) (S65), and executes S3 to S5 in FIG. 5. Accordingly, the trace data accumulated in the first FC-SW 104A (and the second FC-SW 104B) are sent to the first storage control system 106A.

The MP 210 of the first storage control system 106A writes the received trace data into the trace data LDEV 251T (S66), and obtains the written trace data from the trace data LDEV 251T and transfers it to the SVP 110 (S67). For example, the processing at S64 to S67 may be performed at regular or irregular intervals until the MP 210 receives display completion processing from the SVP 110.

When more trace data is received at S67 while the trace data list is being displayed, the SVP 110 updates and displays the trace data list based on this new trace data (S68).

According to the third modified example, when appropriate, such as when the SVP 110 needs the trace data, the trace data accumulated in the first FC-SW 104A (and the second FC-SW 104B) is transferred to the first storage control system 106A.

Note that, the processing at S65 can be performed by the following method, for example.

In response to the given signals from the servers 101A, 101B or the storage control system 106A, 106B, the first FC-SW 104A sends a different type of signal from the normal response signal, whereby it is judged that the sending/receiving of the data has been stopped at the source from which that given signal was sent.

Specifically, for example, in a case of a fabric connection, if a data frame has been received, in response to this the first FC-SW 104A normally returns an ACK (Acknowledgment) signal to the source that sent the data frame. However, when the sending/receiving of the data has stopped, a busy signal or a reject signal can be returned instead of the ACK signal. Accordingly, at the data frame sending source it is judged that the sent data frame was not received for some reason (i.e., the communications were stopped).

Furthermore, for example in a case of a fabric group connection, if an OPEN signal for starting the sending/receiving of data has been received, then the first FC-SW 104A normally returns a R-RDY (Receiver_Ready) response and starts sending/receiving data. However, if this is not to be started, a CLOSE signal is returned to the source that sent the OPEN signal. Accordingly, the sending source judges that the sending/receiving of data cannot be performed.

(4) Fourth Modified Example

Figure 12:
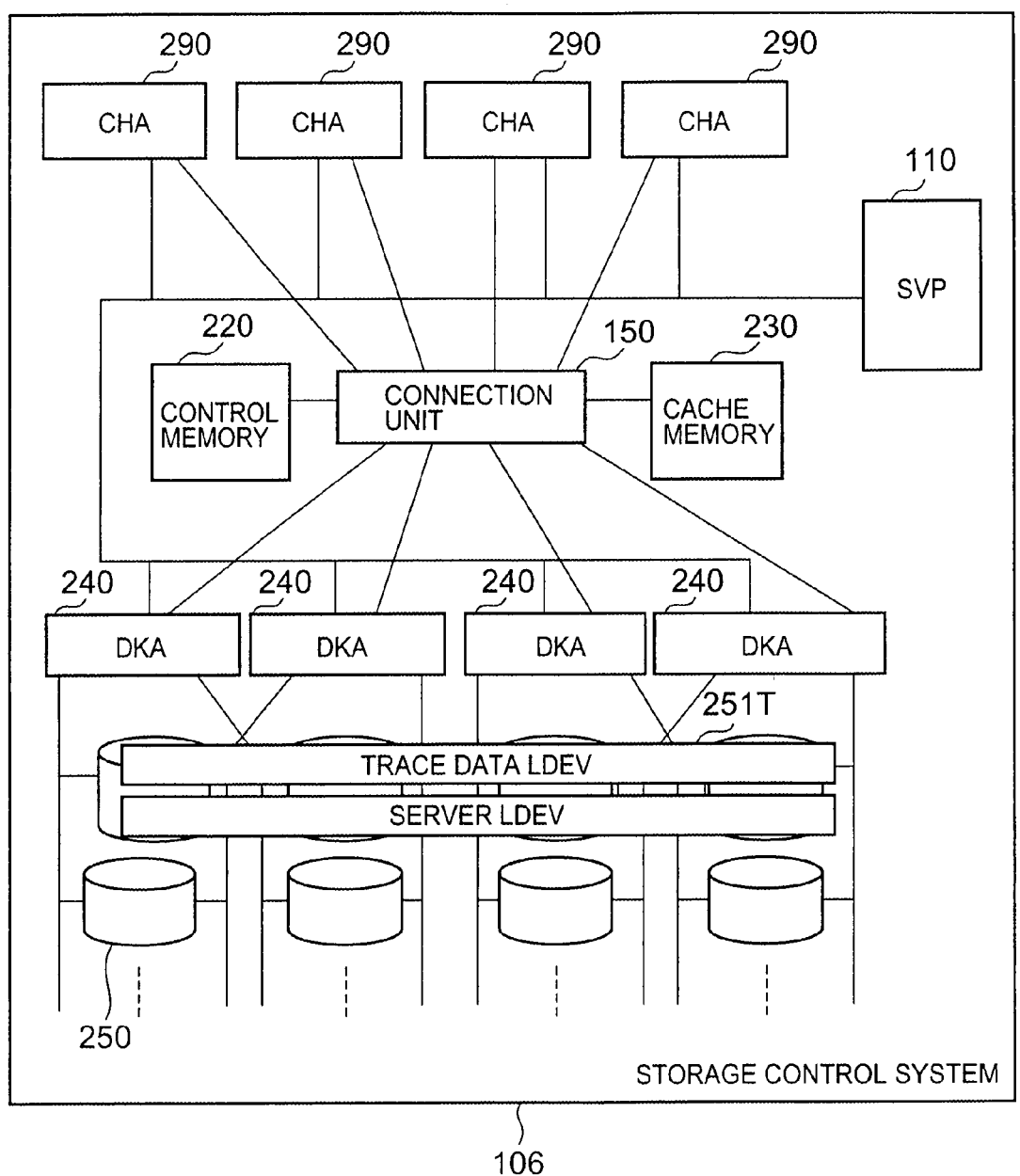
FIG. 12 is an example configuration of a storage control system according to a fourth modified example of an embodiment of the present invention.

FIG. 12 is an example configuration of the storage control system in a fourth modified example of the present embodiment.

The storage control system 106 is provided with a connection unit 800 for connecting the multiple CHAs 290, the control memory 220, the cache memory 230 and multiple DKAs 240. The connection unit 800 is a high-speed crosspath switch, for example. The connection unit 800 may have a function like that of the first FC-SW 104A and the second FC-SW 104B—i.e., generating trace data for the data that passes through the connection unit 800 and storing the trace data in a given memory area (e.g., the cache memory 230, or the control memory 220), and when the trace data sending condition is satisfied, sending the trace data from the given memory area to the trace data LDEV 251T. Furthermore, each CHA 290 and each DKA 240 has 1 or more MPs which are not shown in the diagram, and the MP on the CHA 290 and the MP on the DKA 240 may perform mutual communications between the processors via the control memory 220, so as to store data to the LDEV, read out data from the LDEV, etc.

The foregoing explained the present embodiment and a number of modified examples, but these were example illustrations for explaining the present invention and are not intended to restrict the scope of the present invention to only the embodiment and the modified examples. The present invention can be reduced to practice in a variety of other embodiments. For example, the storage device for storing the trace data in the FC-SW is not restricted to a memory, but may also be a hard disk or other type of storage device. Furthermore, in the foregoing explanations, the first FC-SW 104A and the first storage control system 106A were explained as representative examples, but the other FC-SW 104B and storage control system 106B are similar. Furthermore, the trace data LDEV 251T may be present in any quantity inside a single storage control system. Furthermore, when it is detected that there is little empty capacity in the trace data storage memory 202 (e.g., when it is detected that the empty capacity is at or near zero), the MP 267 of the first FC-SW 104A may stop the receiving of data frames from the server and the storage control system, and may transfer the trace data in the trace data storage memory 202 to the storage control system. Furthermore, when the error information (e.g., dump information from the storage control system or server) is stored in the trace data storage memory 202 in addition to the trace data, not only the trace data but also the error information may be transferred to the trace data LDEV 251T. In this case, the trace data and the error information may be read out and displayed on the SVP 110. Furthermore, each time some failure occurs inside the storage control system, the MP 210 of the storage control system may store the error information about that failure into the trace data LDEV 251T.

What is claimed is:

1. A switch device connected to a plurality of communications devices which are connected to a plurality of host devices and storage control systems, the switch device comprising:
   a plurality of communications ports connected to each of the plurality of communications devices;
   a buffer area for temporarily storing each piece of data received from the plurality of communications devices via the plurality of communications ports;
   a trace data storage area for storing trace data; and
   a processor for sending the data accumulated in the buffer area to a communications device connected to a communications port selected from among the plurality of communications ports,
   wherein the processor stores information about the data received via each of the plurality of communications ports into the trace data storage area as the trace data, and
   when a storage device in one of the storage control systems is connected to at least one of the plurality of communications ports, if it is detected that a trace data transfer condition is satisfied, the processor issues a write command to the storage device, and reads out the trace data stored in the trace data storage area and sends the trace data to the storage device.

2. The switch device according to claim 1, wherein the processor issues a write command to the storage device when in an idle state where processing relating to sending and receiving the data is not performed.

3. The switch device according to claim 1, wherein the processor, in response to a request from the storage device, stops at least the sending processing in the processing for sending and receiving data, and issues a write command to the storage device.

4. The switch device according to claim 1, wherein, when a notification about an occurrence of a failure is received, the processor stores failure occurrence information into the trace data storage area, and protects trace data that has been present since before storing the failure occurrence information so that the trace data is not erased.

5. The switch device according to claim 1, wherein each of the plurality of communications ports belongs to at least one of a plurality of logically determined zones,
   the trace data storage area has a plurality of trace data sub-storage areas corresponding to the plurality of zones, respectively, and
   if it is detected that the trace data transfer condition is satisfied with respect to any of the plurality of zones, the processor issues a write command to the storage device, and reads out the trace data from the trace data sub-storage area corresponding to the zone satisfying the trace data transfer condition.

6. A storage control system connected to a host device via at least one of a plurality of communications ports of a switch device, the storage control system comprising:
   a plurality of storage devices for storing data; and
   a storage control system processor for writing data received from the host device into one of the storage devices,
   wherein the plurality of storage devices include a trace data storage device for storing trace data sent from the switch device which is connected to a plurality of communications devices connected to a plurality of storage control systems and host devices, said trace data is information about the data received by the switch device via each of the plurality of communications ports, and
   when a write command and the trace data obtained by the switch device are received from the switch device, the storage control system processor writes the trace data into the trace data storage device.

7. The storage control system according to claim 6, wherein when an external device connected to the storage control system requests the trace data inside the trace data storage device, the storage control system processor, in response to the request, reads out and sends the trace data from the trace data storage device to the external device and sends a trace data transfer request to the switch device.

8. A trace data obtaining method, comprising the steps of:
   temporarily storing by a switch device into a buffer area of the switch device data received via each of a plurality of communications ports from a plurality of communications devices which are connected to a plurality of host devices and storage control systems including a storage device;
   storing by the switch device information relating to the data received via each of the plurality of communications ports as trace data, into a trace data storage area of the switch device provided separately from the buffer area;
   sending by the switch device data accumulated in the buffer area to a communications device connected to a communications port selected from among the plurality of communications ports;
   issuing by the switch device a write command to the storage device when it is detected that a trace data transfer condition is satisfied;
   reading out by the switch device the trace data stored in the trace data storage area;
   sending by the switch device to the storage device the trace data that was read out; and
   writing the trace data into the storage device in response to the write command.

9. The trace data obtaining method according to claim 8, wherein the switch device executes the issuing step when in an idle state where processing relating to sending and receiving the data is not performed.

10. The trace data obtaining method according to claim 8, further comprising the steps of:
    when a device external to the storage device requests trace data, sending by the storage device stored trace data to the external device and sending by the storage device a trace data transfer request to the switch device in response to the request;
    executing by the switch device the issuing step in response to the transfer request; and
    writing by the storage device the trace data from the switch device into the storage device, and sending by the storage device the written trace data to the external device.

11. The trace data obtaining method according to claim 8, further comprising the steps of:
    providing two host devices included in the plurality of communications devices to monitor each other;
    when one of the host devices detects an occurrence of a failure in the other host device, sending by said one host device a notification about the occurrence of a failure to the switch device;

storing by the switch device the failure occurrence information into the trace data storage area based on the notification; and protecting by the switch device trace data that has been present since before storing the failure occurrence information so that the trace data is not erased.

* * * * *